United States Patent [19]

Chen

[11] Patent Number: 5,259,751
[45] Date of Patent: Nov. 9, 1993

[54] MECHANISM FOR FORMING PLASTIC BOARD

[76] Inventor: Jui-Chuah Chen, 58, Ma Yuan West St., Taichung, Taiwan

[21] Appl. No.: 855,602

[22] Filed: Mar. 23, 1992

[51] Int. Cl.⁵ .............. B29C 47/14; B29C 47/86; B29C 47/88
[52] U.S. Cl. .................. 425/378.1; 425/380; 425/382.4; 425/467
[58] Field of Search ............ 425/205, 466, 461, 467, 425/378.1, 382.4, 72.1, 380

[56] References Cited

U.S. PATENT DOCUMENTS

| | | | |
|---|---|---|---|
| 2,504,210 | 3/1985 | Titz et al. | 425/467 |
| 3,815,637 | 6/1974 | Carrow | 425/382.4 |
| 3,854,859 | 12/1974 | Sola | 425/466 |
| 4,113,411 | 9/1978 | Terragni | 425/467 |
| 4,302,172 | 11/1981 | Hogseth et al. | 425/382.4 |
| 4,707,139 | 11/1987 | Valenzky et al. | 425/145 |
| 4,863,653 | 9/1989 | Takubo et al. | 425/205 |

FOREIGN PATENT DOCUMENTS 1329748  8/1987  U.S.S.R. .............. 425/205

*Primary Examiner*—Khanh P. Nguyen

[57] ABSTRACT

A mechanism for forming plastic board including a base, a chamber and a passage formed in the base, a pump disposed in the chamber, a housing disposed above the base and including a passage for supplying plastic materials to the chamber, a pathway formed in the base and communicated with the chamber, two mold disposed in the base, in which one is located above the pathway and the other one below the pathway, the mold cavities being communicated with the pathway such that the plastic materials may flow into the mold cavities via the pathway so as to form the plastic board.

2 Claims, 6 Drawing Sheets

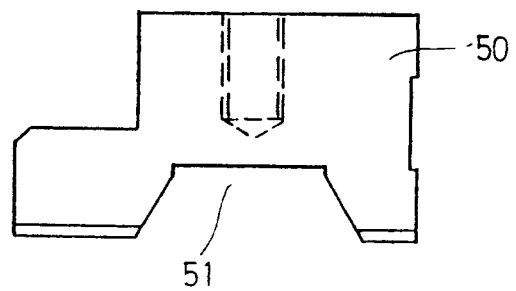
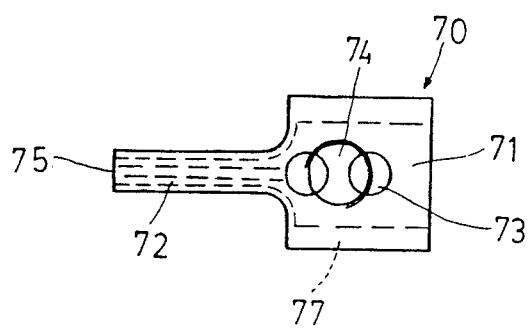
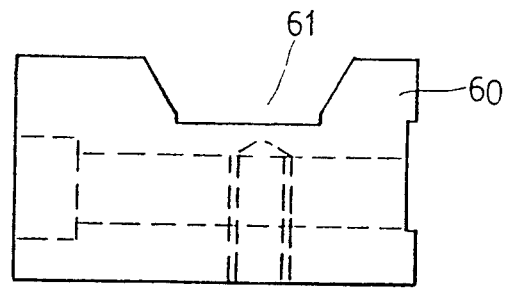
Fig 3

MECHANISM FOR FORMING PLASTIC BOARD

BACKGROUND OF THE INVENTION (a) Field of the Invention

The present invention relates to a mechanism, and more particularly to a mechanism for forming plastic board.

(b) Description of the Prior Art

Generally, plastic boards are formed by injection molding method comprising injecting melted plastic materials into molds. Normally, the plastic materials are melted in a place separated from the molds and are supplied to the molds via tubes or pipes which are exposed to the air such that the plastic materials are apt to be cooled and such that the fluidity of the plastic materials is bad.

SUMMARY OF THE INVENTION

The primary objective of the present invention is to provide a mechanism for forming plastic board, in which the fluidity of the melted plastic materials is good.

In accordance with one aspect of the present invention, there is provided a mechanism for forming plastic board including a base having a chamber and a passage formed therein, a pump disposed in the chamber, a housing disposed above the base and including a passage communicated with the passage of the base, a pump disposed in the housing, a container disposed above the housing for supplying plastic materials to the housing, a number of heating elements disposed on the housing for heating the plastic materials, a pathway formed in the base and communicated with the chamber, two mold disposed in the base, in which one is located above the pathway and the other one below the pathway, the mold cavities being communicated with the pathway such that the plastic materials may flow into the mold cavities via the pathway so as to form the plastic board.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is an end view of the molds which are separated;

DETAILED DESCRIPTION OF THE INVENTION

Figure 1:
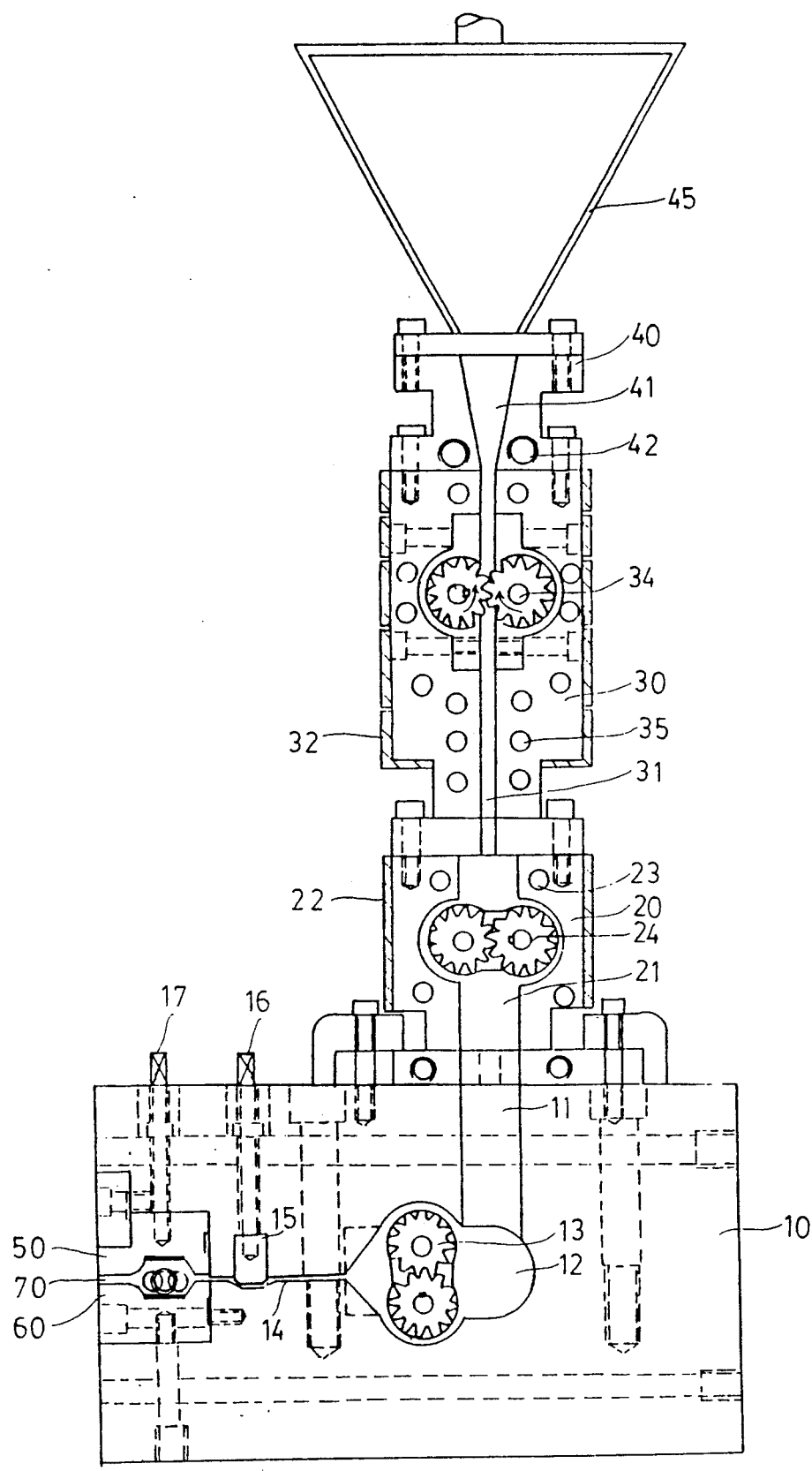
FIG. 1 is a schematic view of a mechanism for forming plastic board in accordance with the present invention.
Figure 2:
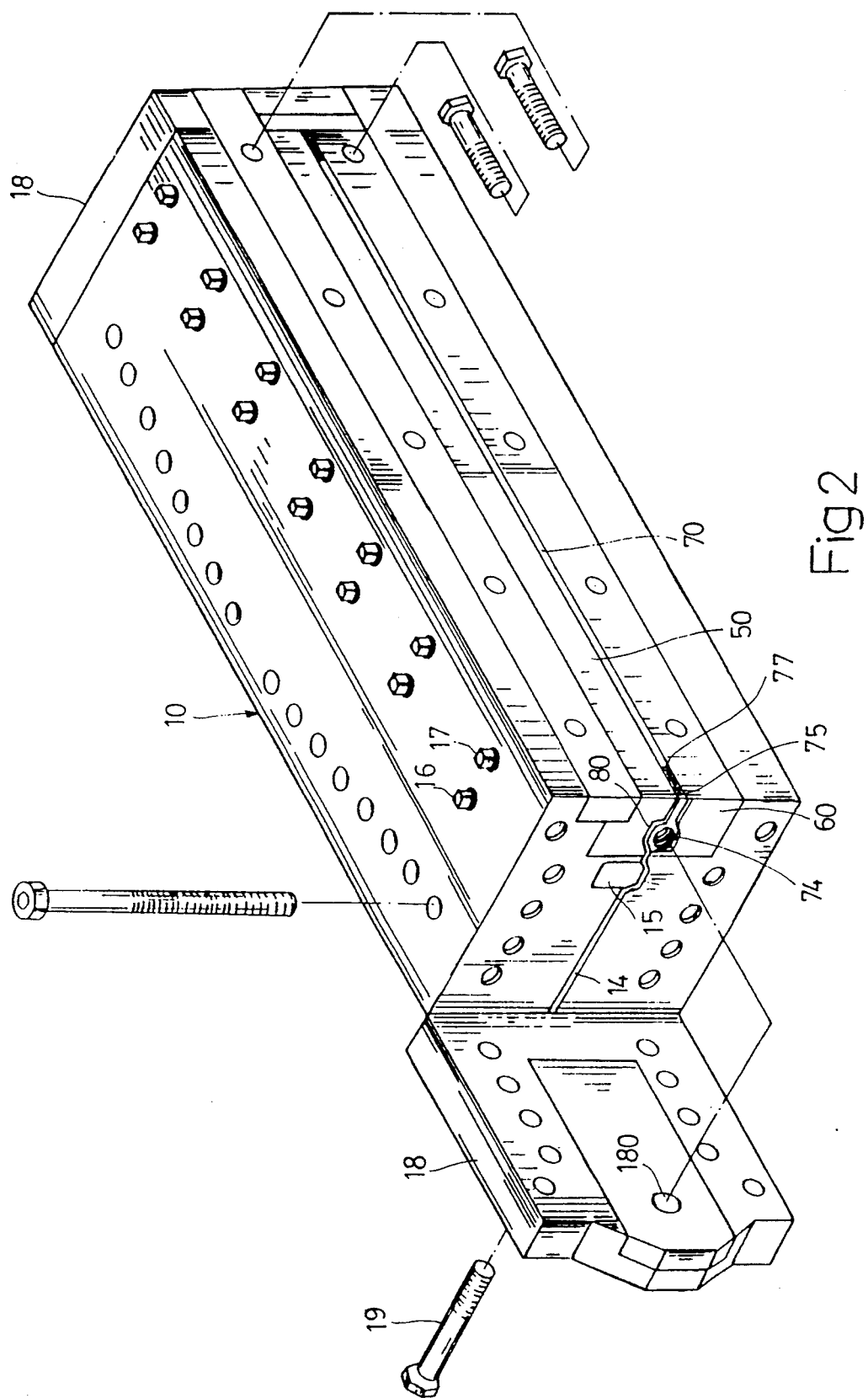
FIG. 2 is a partial perspective view of the molds of the mechanism.
Figure 4:
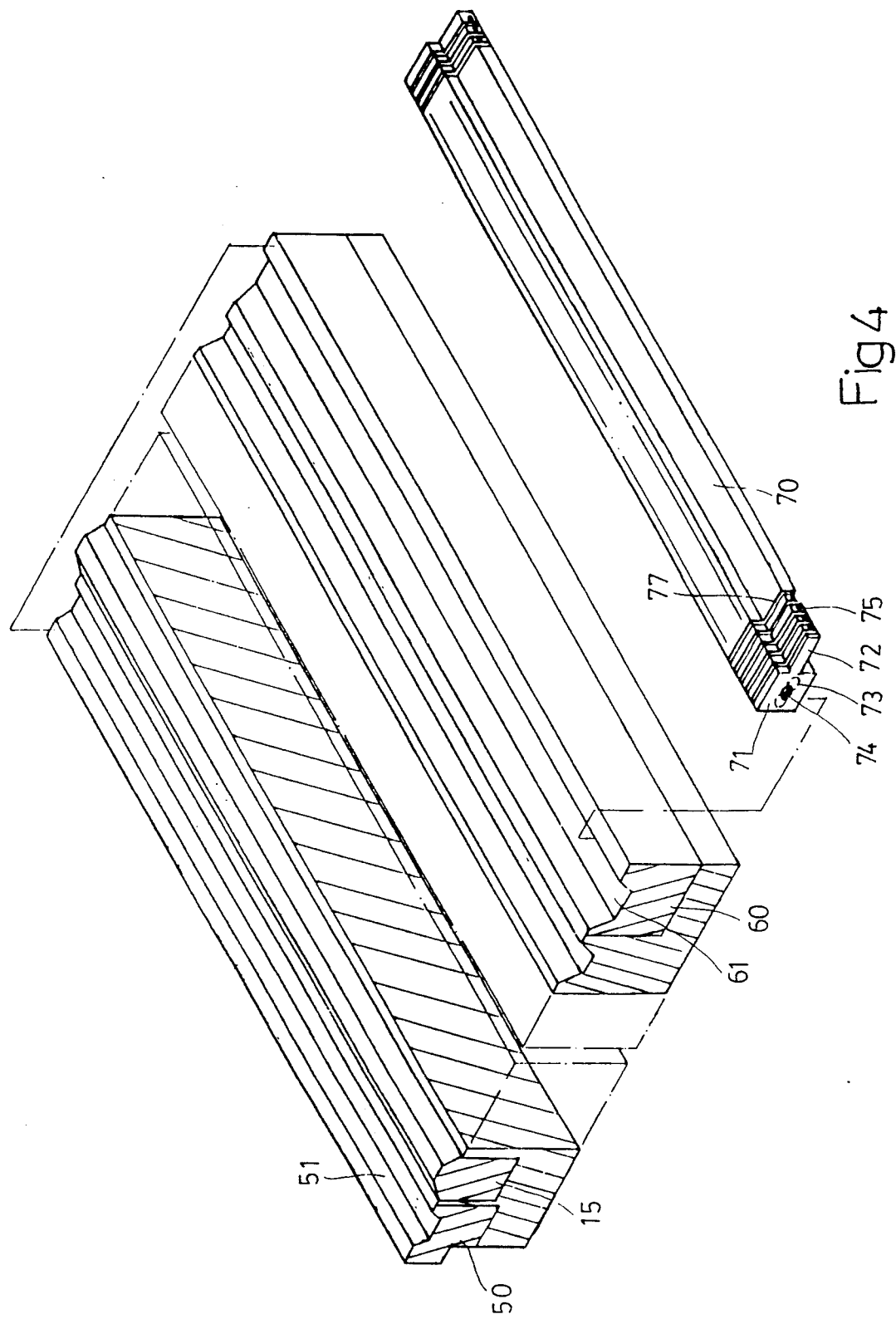
FIG. 4 is a partial perspective view of the molds, in which the molds are opened.
Figure 5:
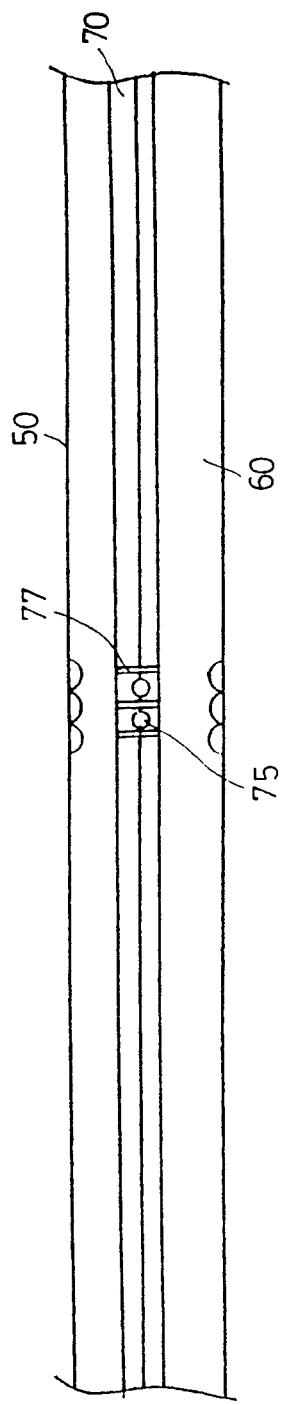
FIG. 5 is a plane view of the mold.

Referring to the drawings and initially to FIG. 1, a mechanism for forming plastic board in accordance with the present invention comprises generally a base 10, and a first housing 20, a second housing 30, a third housing 40 and a container 45 fixed in series on the base 10. Each of the base 10 and the housings 20, 30, 40 has a passage 11, 21, 31, 41 formed therein and aligned with one another and communicated with the container 45. Plastic materials, especially grain type plastic materials are disposed and contained in the container 45 and can flow into the passages 11, 21, 31 and 41.

The third housing 40 includes two cooling pipes 42 for cooling the plastic materials flowing through the passage 41 of the third housing 42. Each of the first and second housings 20, 30 includes a heating element 22, 32 provided on the outer surface thereof, and a plurality of heating pipes 23, 33 and a pump 24, 34 disposed therein. The heating elements 22, 32 and the heating pipes 23, 33 are provided to heat the plastic materials in order to increase the fluidity of the plastic materials. The pumps 24, 34 are provided for mixing and pumping the plastic materials.

The base 10 includes a chamber 12 communicated with the passage 11 and having a pump 13 disposed therein, and a pathway 14 formed and communicated with the chamber 12. The heated or melted plastic materials may flow into the chamber 12 via the passage 11 and may be caused to flow through the pathway 14 by the pump 13. A stop 15 is disposed in the base 10 and can be caused to move toward and move away from the pathway 14 by a bolt 16 so as to adjust the opening size of the pathway 14 and to control the flowing of the plastic materials.

Referring next to FIGS. 2, 3, 4 and 5, an upper mold 50 and a lower mold 60 are disposed and fixed in the base 10, and a block 70 is disposed and clamped between the upper mold 50 and the lower mold 60 so as to form an extrusion die. The upper mold 50 is fixed in the base 10 by such as bolts 17 and located above the pathway 14, and the lower mold 60 is also fixed in the base 10 by bolts and located below the pathway 14. It is preferable that a door 18 is fixed on each side of the base 10 and engaged to the base 10 by bolts 19. The door 18 includes an opening 180 connected to an air source (not shown). The upper mold 50 includes a mold cavity 51 formed in the bottom portion thereof, and the lower mold 60 includes a mold cavity 61 formed in the upper portion thereof. The mold cavities 51, 61 form a space for receiving the block 70 and communicating with the pathway 14 so that plastic materials may flow into the mold cavities 51, 61.

The block 70 includes a body 71 received in the mold cavities 51, 61 and having a rectangular cross section, and a flange 72 laterally extended outward from the body 71 and engaged between the molds 50, 60. A gap 80 is formed between the block 70 and the molds 50, 60. The flange 72 has a height smaller than that of the body 71. The body 71 of the block 70 includes two channels 73 longitudinally formed therein and parallel with each other. A screw hole 74 is formed on one end of the body 71 and communicated with the channels 73 and communicated with the opening 180 of the door 18 when the door 18 is closed so that cooling air may flow into the channels 73 for cooling purposes. A plurality of apertures 75 are laterally formed in the flange 72 and communicated with one of the channels 73 so that cooling air may also flow into the apertures 75. A plurality of grooves 77 are formed around the outer peripheral surface of the block 70 and communicated with the gap 80 so that plastic materials may flow into the gap 80 and the grooves 77. When the melted plastic materials are extruded through the gap 80 and the grooves 77 and are extended out of the molds 50, 60 and the block 70, the cooling air flowing through the apertures 75 and the channels 73 is capable of cooling the melted plastic materials so as to form a plastic board. The plastic board (not shown) includes a flat portion formed by the gap 80 and a plurality of ribs formed by the grooves 77.

Accordingly, the melted plastic materials need not be supplied through pipes which is exposed to the air. The melted plastic materials can be heated and melted by the heating elements 22, 32 and the heating pipes 23, 33 and can be pumped by the pumps 13, 24, 34 such that the fluidity of the plastic materials is greatly increased.

Figure 6:
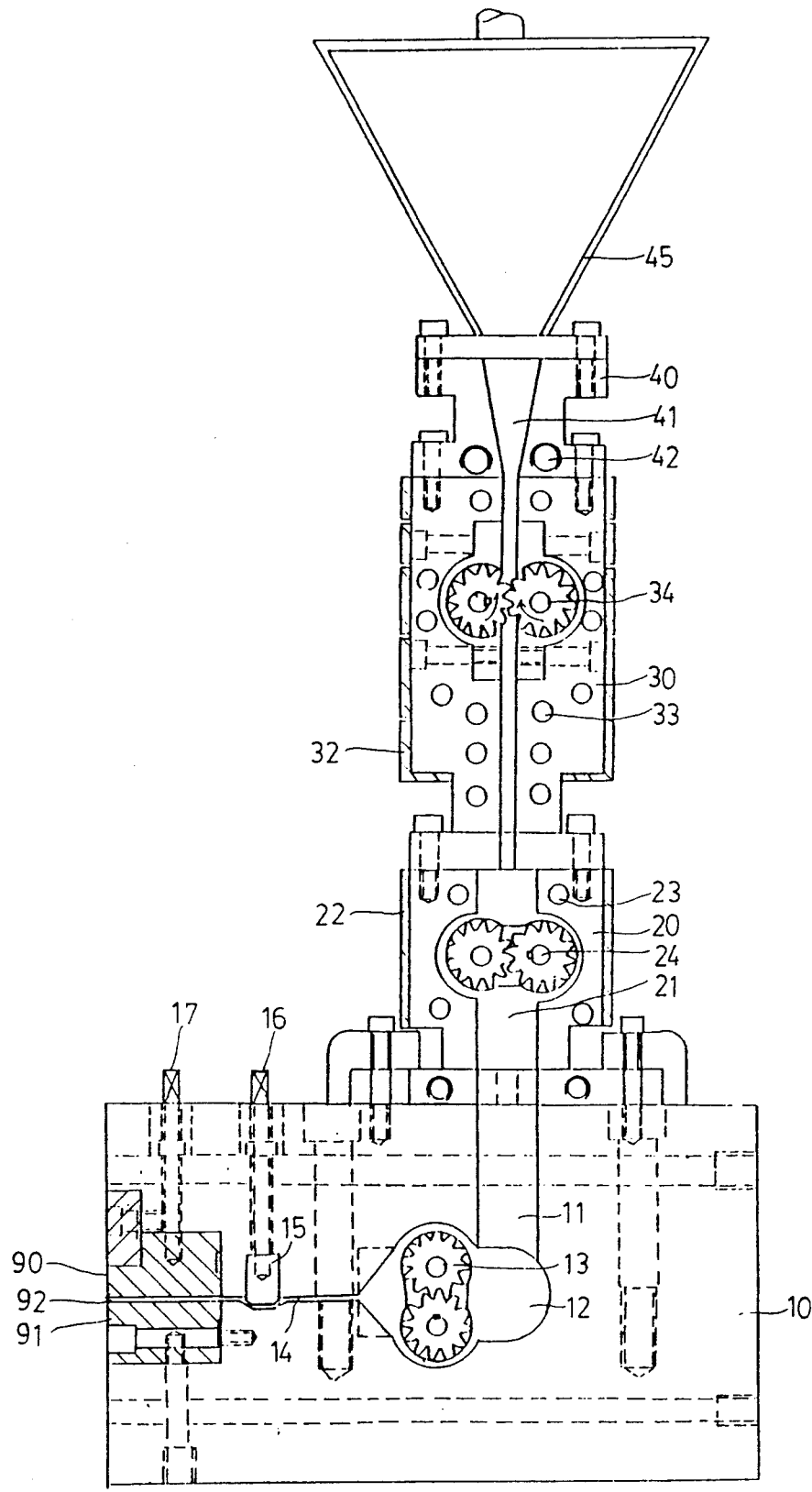
FIG. 6 is a schematic view similar to FIG. 1, illustrating another embodiment of the invention.

Alternatively, as shown in FIG. 6, an upper mold 90 and a lower mold 91 have a flat mold cavity 92 formed therebetween so that a flat plastic board can be formed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mechanism for forming plastic board comprising a base including a chamber formed therein, a first passage communicated with said chamber, a first pump disposed in said chamber, at least one housing disposed above said base and including a second passage formed therein and communicated with said first passage of said base, a second pump disposed in said housing, at least one heating element disposed on said housing, a container for receiving plastic materials being disposed above said housing and communicated with said second passage of said housing, said plastic materials being pumped into said chamber of said base via said first passage and said second passage by said second pump and heated by said heating element, said base including a pathway laterally formed therein and communicated with said chamber, said plastic materials being pumped into said pathway by said first pump, a first mold disposed in said base and located above said pathway and including a first mold cavity formed in a bottom portion thereof, a second mold disposed in said base and located below said pathway and including a second mold cavity formed in an upper portion thereof, said first mold cavity and said second mold cavity forming a space communicated with said pathway such that said plastic materials flow into said space via said pathway, a block including a body received in said space and including at least one channel longitudinally formed therein for receiving cooling air, a gap formed between said body and said first mold and said second mold and communicated with said pathway, and a flange laterally extended from said body and including a plurality of apertures laterally formed therein and communicated with said channel of said body for supplying said cooling air into said apertures, said block including a plurality of grooves formed therearound and communicated with said gap, said plastic materials being extruded through said gap and said grooves and cooled by said cooling air so as to form said plastic board.

2. A mechanism according to claim 1, wherein said base further includes a stop disposed above said pathway and located between said chamber and said first mold, said stop is coupled to said base by at least one bolt and caused to move toward and to move away from said pathway when said bolt is rotated so as to block and to control said plastic materials.

* * * * *